(12) United States Patent
Araki et al.

(10) Patent No.: US 8,214,647 B2
(45) Date of Patent: Jul. 3, 2012

(54) DISTRIBUTED INFORMATION GENERATOR AND RESTORING DEVICE

(75) Inventors: Toshinori Araki, Minato-ku (JP); Satoshi Obana, Minato-ku (JP)

(73) Assignee: NEC Corporation, Tokyo (JP)

(*) Notice: Subject to any disclaimer, the term of this patent is extended or adjusted under 35 U.S.C. 154(b) by 817 days.

(21) Appl. No.: 12/307,089

(22) PCT Filed: Jun. 15, 2007

(86) PCT No.: PCT/JP2007/062114
§ 371 (c)(1),
(2), (4) Date: Dec. 30, 2008

(87) PCT Pub. No.: WO2008/001628
PCT Pub. Date: Jan. 3, 2008

(65) Prior Publication Data
US 2009/0204802 A1   Aug. 13, 2009

(30) Foreign Application Priority Data

| Jun. 30, 2006 | (JP) | 2006-181433 |
| Sep. 5, 2006 | (JP) | 2006-240236 |
| Feb. 5, 2007 | (JP) | 2007-025482 |

(51) Int. Cl.
*H04L 29/06* (2006.01)
(52) U.S. Cl. .................. 713/180
(58) Field of Classification Search .......... 713/180
See application file for complete search history.

(56) References Cited

U.S. PATENT DOCUMENTS

| 2006/0031674 A1* | 2/2006 | Sakurai ............... 713/166 |
| 2007/0118737 A1* | 5/2007 | Shimizu .............. 713/156 |
| 2008/0313148 A1* | 12/2008 | Kuerschner et al. ........ 707/3 |
| 2008/0320314 A1* | 12/2008 | Eckleder et al. ......... 713/189 |
| 2009/0157812 A1* | 6/2009 | Bavly et al. ............. 709/204 |

FOREIGN PATENT DOCUMENTS

| JP | 2001-211150 A | 8/2001 |
| JP | 2002-217891 A | 8/2002 |
| JP | 2004-287333 A | 10/2004 |
| JP | 2004-336577 A | 11/2004 |
| JP | 2005-167794 A | 6/2005 |

OTHER PUBLICATIONS

Adi Shamir, "How to Share a Secret", Comm. ACM, Nov. 1979, pp. 612-613, vol. 22, No. 11.
Martin Tompa et al., "How to Share a Secret with Cheaters", 1998, pp. 261-265.
Wakaha Ogata et al., "Optimum Secret Sharing Scheme Secure Against Cheating", SIAM Journal on Discrete Mathematics, 2006, pp. 79-95, vol. 20, No. 1.
Sergio Cabello et al., "Secret Sharing Schemes with Detection of Cheaters for a General Access Structure", Fundamentals of Computation Theory, 1999, pp. 185-194.

* cited by examiner

*Primary Examiner* — Michael S McNally
(74) *Attorney, Agent, or Firm* — Sughrue Mion, PLLC

(57) ABSTRACT

Check data corresponding to distributed confidential information is generated, and the confidential information and check data are distribution-coded. When the confidential information is restored, the confidential information and check data are restored and it is determined whether or not the restored check data correspond to the restored confidential information. If the data correspond to the information, the information is determined to be correct and is output. If not, the information is judged to be false (i.e., tampered distributed information), and a symbol indicating that falsity has been detected is output.

30 Claims, 5 Drawing Sheets

DISTRIBUTED INFORMATION GENERATOR AND RESTORING DEVICE

TECHNICAL FIELD

This application is based upon and claims the benefit of priority from Japanese patent application No. 2006-181433, filed on Jun. 30, 2006, and Japanese patent application No. 2006-240236, filed on Sep. 5, 2006, and Japanese patent application No. 2007-025482, filed on Feb. 5, 2007, the disclosures of which are incorporated herein in its entirety by reference.

The present invention relates to a distributed information generator for safely storing and distributing confidential information, and a restoring device for restoring stored confidential information.

BACKGROUND ART

When confidential information (for example, a secret key for use in encryption) is stored, there are the threat of loss or breakage of data and the threat of theft of data. For the former threat, the creation of a copy of confidential information would be effective, but the creation of the copy would result in an increase in the threat of theft. As one information security technology for solving such a problem, there is a secret sharing scheme.

In a (k,n) threshold scheme, which is one secret sharing scheme, distribution-codes confidential information which is object of protection into n pieces of information, and the (k,n) threshold scheme has a feature that the confidential information can be restored if k or more arbitrary pieces of distributed information are collected, and the information relating the confidence cannot be obtained if (k−1) or less arbitrary pieces of distributed information are collected. Accordingly, even if up to (k−1) pieces of distributed information are stolen, confidential information cannot be read, and even if up to (n−k) pieces of distributed information are broken, confidential information can be restored. This (k,n) threshold scheme is described in detail, for example, in Non-Patent Document 1 (Adi Shamir, "How to share a secret," Comm. ACM, 22(11), pp. 612-613 (1979)).

In the following, consider problems when confidential information is restored in a situation where distributed information is legitimately created and distributed in accordance with a normal (k,n) threshold scheme.

When confidential information is to be restored, distributed information must be collected from other sources which hold the distributed information. In this event, parties to whom a request has been made for distributed information do not always supply the values, which they have obtained, to a restoring party without tampering with them. In this regard, "tampering" herein referred to includes not only intentional changes but also unintentional changes such as a failed device, simple mistake and the like.

If confidential information is restored using tampered distributed information, the resulting value can be a value different from the confidential information. For this reason, an approach is desired to permit a secret sharing scheme to detect with a high probability that a tampered value exists within distributed information for use in restoration. Also, distributed information is obtained by a variety of means, depending on how the information is used, so that it is desirable that a tampered value be detected with a high degree of probability when distributed information is obtained on the basis of any probability distribution.

As one technology for solving these problems, a method described in Non-Patent Document 2 (Martin Tompa, Heather Woll, "How to Share a Secret with Cheaters," Journal of Cryptology, vol. 1, pages 133-138, 1988.) is known.

Non-Patent Document 2 describes a (k,n) threshold scheme which can detect falsity with a probability of $(1-\epsilon)$ when distributed information is obtained on the basis of any probability distribution. In the method described in Non-Patent Document 2, when confidential information is a set of a number s of elements, distribution information is a set of a number $((s-1)(k-1)/\epsilon+k)^2$ of elements.

Also, Non-Patent Document 3 (Wakaha Ogata, Kaoru Kurosawa, Douglas R Stinson, "Optimum Secret Sharing Scheme Secure Against Cheating," SIAM Journal on Discrete Mathematics, vol. 20, no 1, pages 79-95, 2006.) describes a (k,n) threshold scheme which is capable of sensing falsity with a probability of $(1-\epsilon)$ on condition that distributed information is selected in accordance with a uniform probability distribution. In the method described in Non-Patent Document 3, when confidential information is a set of a number s of elements, distribution information is a set of a number $(1+(s-1)/\epsilon)$ of elements.

However, the conventional secret sharing schemes as described above has a problem in which the amount of distributed information becomes large as compared with the amount of confidential information.

SUMMARY

An exemplary object of the present invention to provide a distributed information generator and a restoring device which are capable of detecting falsity when confidential information is obtained on the basis of any probability distribution, and to require that the amount of distributed information be smaller as in the case of conventional technologies.

To achieve the above object, the present invention generates check data corresponding to confidential information to be distributed, and distribution-codes the confidential information and check data, respectively. When the confidential information is restored, the confidential information and check data are restored, respectively, to determine whether or not the restored check data is data corresponding to the restored confidential data. The confidential information is determined to be correct when it corresponds to the restored check data and is output, whereas the confidential information is determined to be false (there is a tampered distributed information) when it does not correspond to the restored check data, and a symbol is output to indicate that falsity has been detected.

Falsity can be detected if it is determined whether or not the thus restored check data corresponds to the restored confidential information, and the data size of distributed information for the confidential information can be reduced as compared with the conventional secret sharing scheme by using a data set which has a smaller number of elements as the check data.

Also, since check data can be uniformly selected at random, a high rate for detecting falsity is ensured when confidential information is selected on the basis of any probability distribution.

BRIEF DESCRIPTION OF THE DRAWINGS

FIG. 1 is a block diagram showing an exemplary configuration of a distributed information generator of the present invention.

FIG. 2 is a block diagram showing an exemplary configuration of a restoring device of the present invention.

FIG. 3 is a block diagram showing an example of implementing the distributed information generator and restoring device by a computer.

FIG. 4 is a flow chart showing the operation of the distributed information generator of the present invention.

FIG. 5 is a flow chart showing the operation of the restoring device of the present invention.

EXEMPLARY EMBODIMENT

Figure 1:
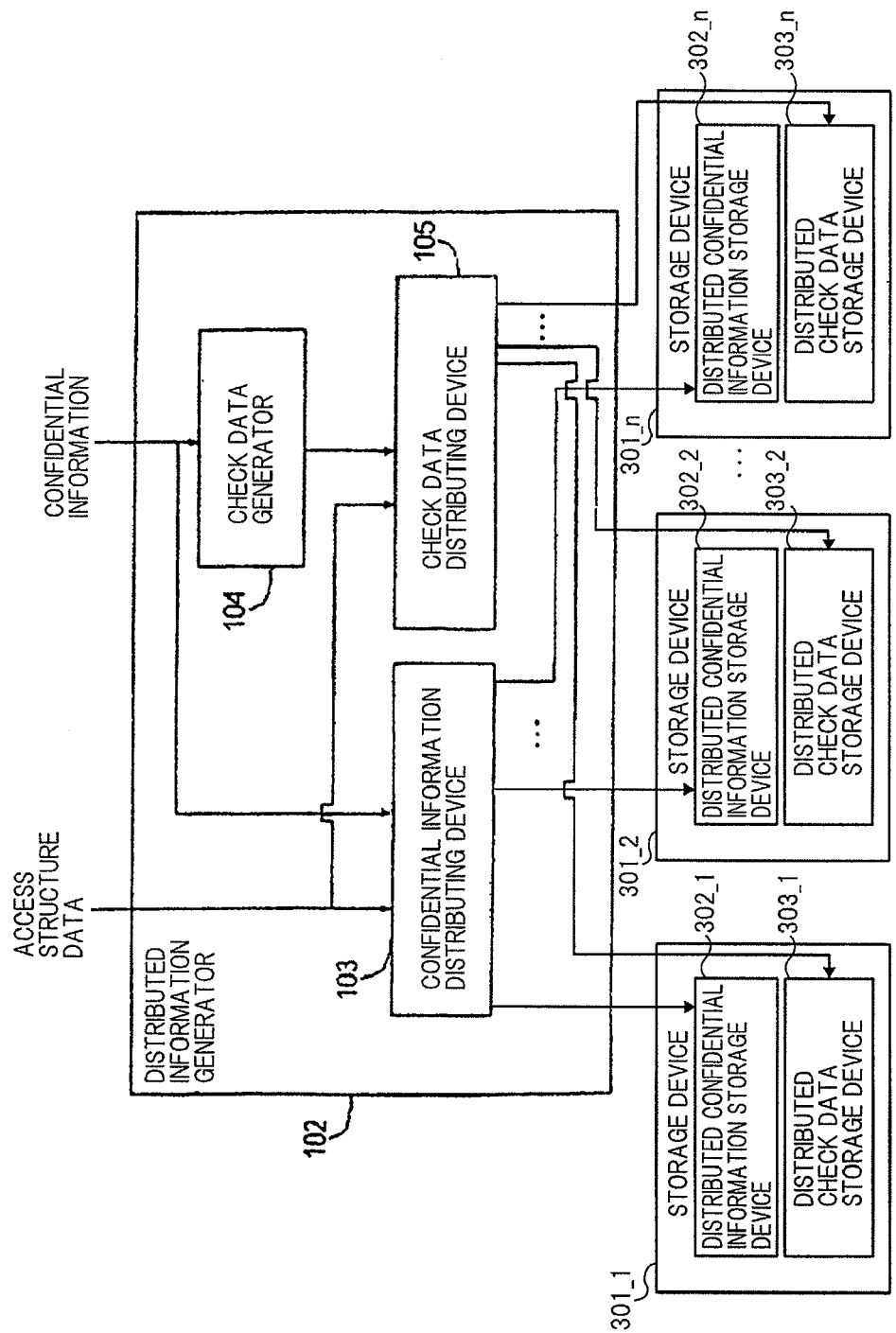
[FIG. 1]

Next, the exemplary embodiment of the present invention will be described with reference to the drawings.

First, terms used in this specification will be described in brief.

Access Structure Refers to conditions under which confidential information can be restored in a secret sharing scheme. In this specification, data indicative of the access structure is called "access structure data."

Access Set: Refers to a set of distributed information which can restore confidential information in the secret sharing scheme.

Linear Secret sharing scheme: Refers to a secret sharing scheme which can generate distributed information $W=(W\_1, W\_2, \ldots, W\_n)$ using a k*n matrix G in accordance with an equation of $W=U*G$, where (k−1) independent random numbers are represented by $R\_1, R\_2, \ldots, R\_{k-1}$ and vector $(S, R\_1, R\_2, \ldots, R\{k-1\})$ is represented by U. In this specification, the access structure will be described, giving the linear secret sharing scheme as an example.

Function Specifying Data: Refers to data for uniquely specifying elements (elements) of function set H. In this specification, a function which is an element of function set H and which is uniquely specified by function specifying data k is designated by H_k.

Confidential information data set S: Refers to a set of confidential information s which is object of keeping.

Distributed Confidential Information Data Set BS: Refers to a set of data (distributed information) resulting from distributive coding of confidential information s.

Data Set BC for Distribution Checking: Refers to a set of check data which is generated to correspond with confidential information s.

A confidential information distribution system of the present invention generates check data corresponding to confidential information when the confidential information is to be stored, distribution-codes the confidential information and check data, respectively, in accordance with an access structure indicative of access structure data of a secret sharing scheme, and stores them in a storage device.

Also, when confidential information is restored, distribution-coded confidential information and distribution-coded check data are read from a plurality of storage devices corresponding to an access set of the access structure to restore the confidential information and check data. Then, it is determined whether or not the restored check data corresponds to the confidential information, and the restored confidential information is determined to be correct when it corresponds thereto, and is determined to be false (tampered) when it does not correspond thereto.

The confidential information distribution system of the present invention comprises distributed information generator 102, restoring device 200, and a plurality of storage devices 301_1-301_n. Storage devices 301_1-301_n comprises distributed confidential information storage devices 302_1-302_n for storing elements of distributed confidential information data set BS, and distributed check data storage devices 303_1-303_n for storing elements of distributed check data set BC.

First, the configuration of distributed information generator 102 will be described with reference to FIG. 1.

FIG. 1 is a block diagram showing an exemplary configuration of distributed information generator 102.

As shown in FIG. 1, distribution information generator 102 comprises check data generator 104, confidential information distributing device 103, and check data distributing device 105.

Distributed information generator 102 is applied with confidential information s which comprises elements (elements) of confidential information data set S, and access structure data indicative of an access structure in accordance with a linear secret sharing scheme. Distributed information generator 102 stores distributed information which comprises elements of distributed confidential information data set BS in distributed confidential information storage device 302 of storage device 301 specified by the access structure data. Also, the check data, which comprises elements of distributed check data set BC, is stored in distributed check data storage device 303 of storage device 301 specified by the access structure data.

Check data generator 104 is applied with elements s of confidential information data set S. Check data generator 104 can efficiently and randomly select function specifying data a with which arbitrary element y of output set B and arbitrary element x of input set S satisfy $H\_a(x)=y$, when a function set is H, where confidential information data set S is the input set, and the output set is B.

In this exemplary embodiment, when arbitrary different elements of input set S are x_1 and x_2: an arbitrary function specifying data is c; a set of function specifying data k including the c is K; a falsity detection probability is (1−δ); a function set represented by $|\{b|b\}\in K, H\_b(x\_1)=y, H\_\{b+c\}(x\_2)=y\}|/|\{b|b\in K, H\_b(x\_1)=y\}|\leq \delta$ is H. Function specifying data k which satisfies $H\_k(x)=y$ is randomly selected, and the selected function specifying data k is output as check data corresponding to x_1 and x_2.

Confidential information distributing device 103 is applied with elements of confidential information data set S and the access structure data. Confidential information distributing device 103 stores elements of distributed confidential information data set BS in distributed confidential information storage device 302 of storage device 301 specified by the access structure data.

Check data distributing device 105 is applied with elements of input set K and the access structure data. Check data distributing device 105 stores elements of distributed check data set BC in distributed check data storage device 303 of storage device 301 specified by the access structure data.

Next, the configuration of restoring device 200 will be described with reference to FIG. 2.

Figure 2:
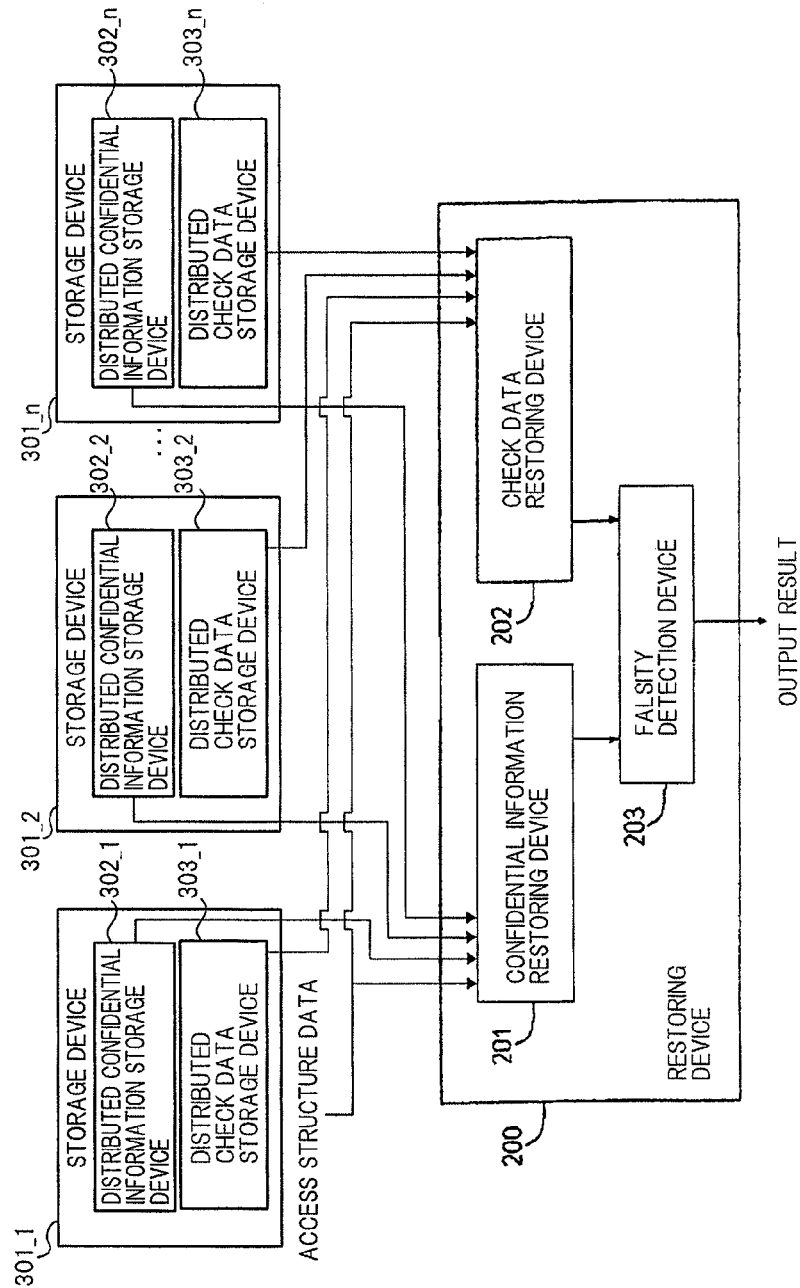
[FIG. 2]

FIG. 2 is a block diagram showing an exemplary configuration of restoring device 200.

As shown in FIG. 2, restoring device 200 comprises confidential information restoring device 201, check data restoring device 202, and falsity detection device 203.

Restoring device 200 is applied with the access structure data indicative of the access structure in accordance with the linear secret sharing scheme. Restoring device 200 reads and restores elements of distributed confidential information data set BS from distributed confidential information storage devices 302_1-302_n contained in storage devices 301_1-301_n, reads and restores elements of distributed check data set BC from distributed check data storage devices 303_1-303_n, and outputs a symbol which indicates that elements of restored confidential information data set S, or a false share (distributed information) have been detected.

Confidential information restoring device 201 is applied with the access structure data. Confidential information restoring device 201 reads elements of distributed confidential information data set BS from distributed confidential information storage device 302 contained in storage device 301, and outputs elements of restored confidential information data set S.

Check data restoring device 202 is applied with the access structure data. Check data restoring device 202 reads elements of distributed check data set BC from distributed check data storage device 303 contained in storage device 301, and outputs elements of restored function specifying data set K.

Falsity detection device 203 is applied with elements of confidential information data set S restored by confidential information restoring device 201, and elements of function specifying data set K restored by check data restoring device 202, and outputs elements of restored confidential information data set S when H_k(s)=y is satisfied, and outputs a symbol which indicates that a false share has been detected when not satisfied.

Distributed information generator 102 and restoring device 200 are implemented by a semiconductor integrated circuit, for example, LSI (large Scale Integration), DSP (Digital Signal Processor) or the like which comprises logic circuits and the like.

Figure 3:
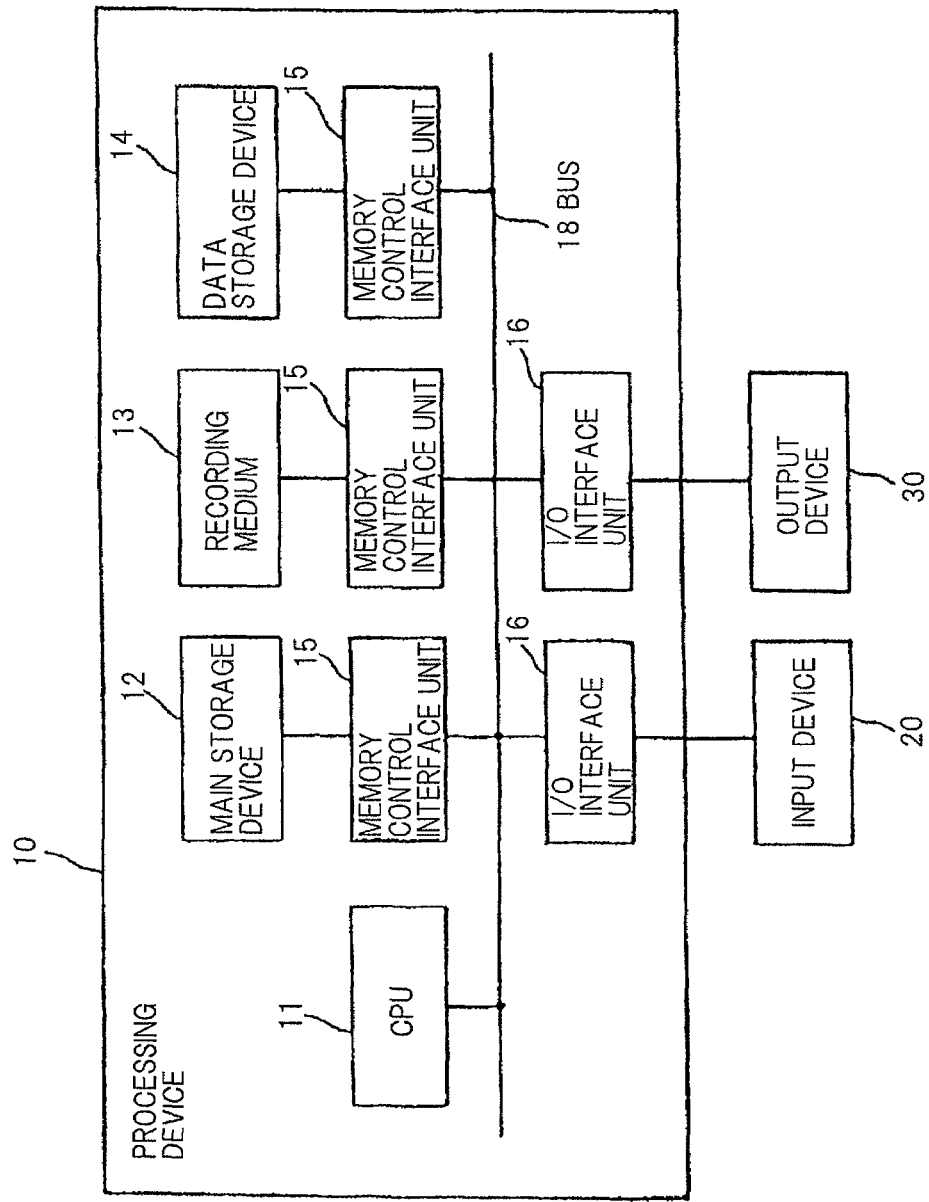
[FIG. 3]

Alternatively, distributed information generator 102 and restoring device 200 may be implemented by a computer, as shown in FIG. 3, which comprises processing device 10 for executing predetermined processing in accordance with a program; an input device 20 for inputting commands, information and the like to processing device 10; and output device 30 for monitoring processing results of processing device 10.

Processing device 10 shown in FIG. 3 comprises CPU 11; main storage device 12 for temporarily storing information required for processing of CPU 11; recording medium 13 which has recorded thereon a program for causing CPU 11 to execute processing as distributed information generator 102 or as restoring device 200, later described; data storage device 14 for storing confidential information and access structure data; memory control interface unit 15 for controlling data transfers among main storage device 12, recording medium 13, and data storage device 14; and I/O interface unit 16 which is an interface device with input device 20 and output device 30, all of which are connected through bus 18. In this regard, data storage device 14 need not reside within processing device 10, but may be provided independently of processing device 10. Also, data storage device 14 may be used as storage device 301 which comprises security confidential information storage device 302 and distributed check data storage device 303.

Processing device 10 implements functions as distributed information generator 102 and restoring device 200, later described, in accordance with a program recorded on recording medium 13. Recording medium 13 may be a magnetic disk, a semiconductor memory, an optical disk, or another recording medium.

Next, the operation of the confidential information distribution system of the present invention will be described with reference to FIGS. 4 and 5.

Figure 4:
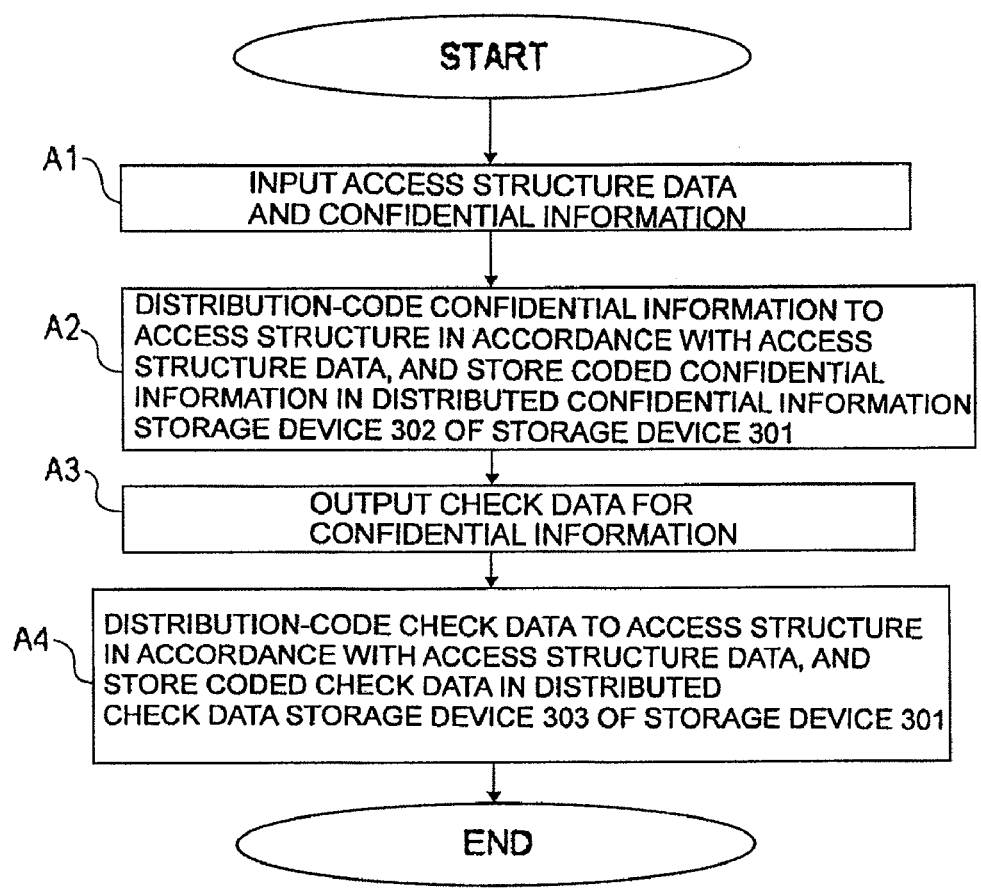
[FIG. 4]
Figure 5:
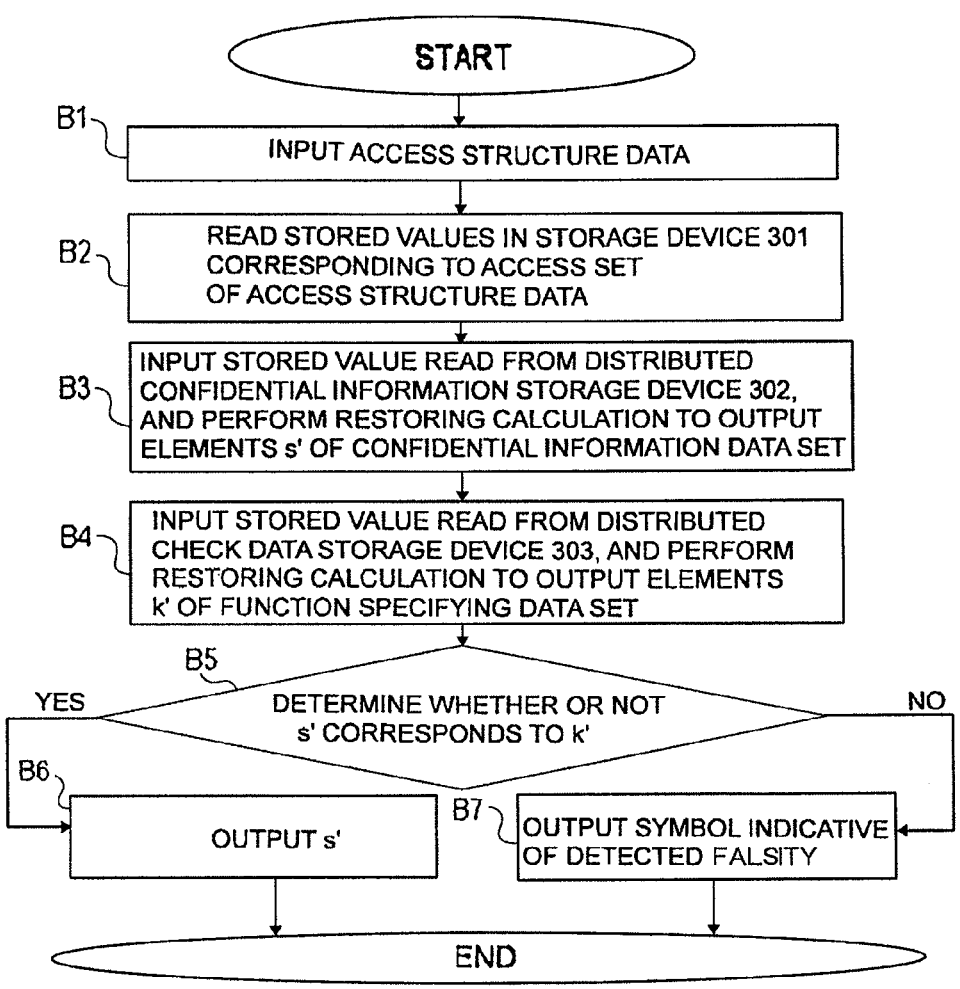
[FIG. 5]

FIG. 4 is a flow chart showing the operation of the distributed information generator, while FIG. 5 is a flow chart showing the operation of restoring device 200.

As shown in FIG. 4, distributed information generator 102 is applied with access structure data which is data indicative of an access structure, for example, in accordance with a linear secret sharing scheme, and confidential information s which comprises elements of confidential information data set S (step A1).

When confidential information distributing device 103 is applied with the access structure data and confidential information s, distributed information generator 102 distribution-codes confidential information s in an access structure corresponding to the access structure data, and stores the coded confidential information in distributed confidential information storage device 302 of storage device 301 (step A2).

Also, distributed information generator 102 randomly generates function specifying data k which satisfies aforementioned $H_k(s)=y$, based on confidential information s, by check data generator 104 (step A3).

Distributed information generator 102 distribution-codes function specifying data k in an access structure corresponding to the access structure data, based on the access structure data and function specifying data k, by check data distributing device 104, and stores the coded function specifying data in distributed check data storage device 303 of storage device 301 (step A4).

As shown in FIG. 5, restoring device 200 is applied with access structure data indicative of the access structure of the linear secret sharing scheme (step B1). Restoring device 200 reads data stored in storage device 301 corresponding to an access set indicated by the access structure data (step B2).

Restoring device 200 restores elements s' of confidential information data set S using a restoring method corresponding to the distributive coding method used by confidential information distributing device 103 by confidential information restoring device 201 based on the data read from distributed confidential information storage device 302 of storage device 301 and the access structure data (step B3).

Also, restoring device 200 restores elements k' of function specifying data set K using a restoring method corresponding to the distributive coding method used by check data distributing device 105 by check data restoring device 202 based on the data read from distributed check data storage device 303 of storage device 301 and the access structure data (step B4).

Next, restoring device 200 checks whether or not $H_{k'}(s')=y$ by falsity detection device 203 using elements s' of confidential information data set S restored by confidential information restoring device 201 and elements k' of function specifying data set K restored by check data restoring device 202, to determine whether or not s' is data corresponding to k' (step B5). Restoring device 200 outputs s' when s' is data corresponding to k' (step B6), and outputs a symbol indicative of a false detection when s' is not data corresponding to k' (step B7).

According to the present invention, falsity can be detected by determining whether or not restored check data corresponds to restored confidential information, and the data size of distributed information can be reduced if a data set having a smaller number of elements is used as check data. Also, since the check data can be uniformly selected at random, a high rate for detecting falsity can be ensured when the confidential information is selected on the basis of any distribution. It is therefore possible to detect falsity when the confidential information is selected on the basis of any distribution, and the data size of the distributed information is reduced for the confidential information, as compared with the conventional secret sharing scheme.

FIRST EXAMPLE

A confidential information distribution system of a first example is an example in which Z/pZ is used for a data set of confidential information, $H\_\{e\_0, e\_1\}(x)=e\_0-x*e\_1$ is used as function set H when function specifying data is a set of elements $e\_0, e\_1$ of Z/pZ, and an input set comprises elements x of Z/pZ, and data indicative of an access structure of a (k,n) threshold scheme is used as access structure data of a linear secret sharing scheme. In this regard, Z/pZ is a finite field for prime number p, and the use of addition in the finite field is represented by "+"; subtraction by "−"; multiplication by "*"; and division by "/."

In check data generator 104 of the first example, function specifying data $a\_1, a\_2$, which satisfy $H\_\{a\_1, a\_2\}(x)=0$ can be randomly selected as check data for arbitrary elements x of Z/pZ.

Here, when a function specifying data set of H is designated by K for arbitrary different elements $x\_1, x\_2$ of Z/pZ and for arbitrary function specifying data $c\_1, c\_2$, $|\{b\_1, b\_2|b\_1, b\_2 \ Z/pZ, H\_\{b\_1, b\_2\}(x-1)=0, H\_\{(b\_1+c\_1), (b\_2+c\_2)\}(x\_2)=0\}|/|\{b\_1, b\_2|b\_1, b\_2 \ Z/pZ, H\_\{b\_1, b\_2\}(x\_1)=0\}|=1/p$ are established.

Data indicative of an access structure of the (k,n) threshold scheme is specifically comprised of k, n which are positive integers, and $\{i\_1, i\_2, \ldots, i\_n\}$ which comprises a set of elements of Z/pZ. However, assume that k, n, p satisfy $k \leq n \leq p-1$.

In this regard, assume that confidential information distributing device 103 and check data distributing device 104 distribution-code confidential information and check data using the (k,n) threshold scheme described in Non-Patent Document 1, and that confidential information restoring device 201 and check data restoring device 202 restore confidential information and check data using a restoring method corresponding to the (k,n) threshold scheme.

Next, a description will be given of distributed information generator 102 and restoring device 200 of the first example.

Distributed information generator 102 of the first example is applied with access structure data k, n, $\{i\_1, i\_2, \ldots, i\_n\}$, and confidential information S.

Distributed information generator 102 randomly generates a (k−1)th polynomial which has a constant term of s on Z/pZ by confidential information distributing device 103, when it is applied with access structure data k, n, $\{i\_1, i\_2, \ldots, i\_n\}$, and confidential information s. This (k−1)th polynomial is designated by $f\_s(x)$.

Confidential information distributing device 103 calculates $f\_s(i\_1), f\_s(i\_2), \ldots, f\_s(i\_n)$, and stores the calculation result in distributed confidential information storage device 302_{i_1} of storage device 301_{i_1}, distributed confidential information storage device 302_{i_2} of storage device 301_{i_2}, ..., distributed confidential information storage device 302_{i_n} of storage device 301_{i_n}.

Check data generator 104 randomly generates $e\_0$ and $e\_1$ which satisfy $e\_0-s*e\_1=0$ based on confidential information s.

Check data distributing device 104 randomly generates a (k−1)th polynomial which has a constant term of $e\_0$ on Z/pZ and a (k−1)th polynomial which has a constant term of $e\_1$ on Z/pZ, based on access structure data k, n, $\{i\_1, i\_2, \ldots, i\_n\}$ and $e\_0, e\_1$. They are designated by $f\_\{e\_0\}(x), f\_\{e\_1\}(x)$.

Check data distributing device 104 calculates $f\_\{e\_0\}(i\_1), f\_\{e\_0\}(i\_2), \ldots, f\_\{e\_0\}(i\_n)$ and $f\_\{e\_1\}(i\_1), f\_\{e\_1\}(i\_2), \ldots, f\_\{e\_1\}(i\_n)$, and stores $(f\_\{e\_0\}(i\_1), f\_\{e\_1\}(i\_1))$ in distributed check data storage device 303_{i_1}; stores $(f\_\{e\_0\}(i\_1), f\_\{e\_1\}(i\_1))$ in distributed check data storage device 303_{i_2} of storage device 301_{i_2}; ...; stores $(f\_\{e\_0\}(i\_1), f\_\{e\_1\}(i\_1))$ in distributed check data storage device 303{i_n} of storage device 301_{i_n}.

On the other hand, restoring device 200 of the first example is applied with access structure data k, n, $\{i\_1, i\_2, \ldots, i\_n\}$.

Restoring device 200 reads data from each distributed confidential information storage device 302 of storage devices 303_{j_1}, 301_{j_2}, 301_{j_k}. These data are designated by $bs\_\{j\_1\}, bs\_\{j\_2\}, \ldots, bs\_\{j\_k\}$, Confidential information restoring device 201 is applied with $j\_1, bs\_\{j\_1\}), (j\_2, bs\_\{j\_2\}), \ldots, (j\_k, bs\_\{j\_k\})$, and generates $g\_s(0)$ of (k−1)th polynomial $g\_s(x)$ on Z/pZ which passes through coordinates $(j\_1, bs\_\{j\_1\}), (j\_2, bs\_\{j\_2\}), \ldots, (j\_k, bs\_\{j\_k\})$. Specifically, $g\_s(0)$ is calculated by a method which solves simultaneous equations, a method which uses Lagrange interpolation, or the like.

Also, restoring device 200 reads data from each distributed check data storage device 303 of storage devices 301_{j−1}, 301_{j_2}, ..., 301_{j_k}. These data are designated by $(be0\_\{j\_1\}, be1\_\{j\_1\}), (be0\_\{j\_2\}, be1\_\{j\_2\}), \ldots, (be0\_\{j\_k\}, be1\_\{j\_k\})$.

Check data restoring device 202 is applied with $(j\_1, be0\_\{j\_1\}, be1\_\{j\_1\}), (j\_2, be0\_\{j\_2\}, be1\_\{j\_2\}), \ldots, (j\_k, be0\_\{j\_k\}, be1\_\{j\_k\})$, and generates $g\_e0(0)$ of (k−1)th polynomial $g\_e0(x)$ on Z/pZ which passes through coordinates $(j\_1, be0\_\{j\_1\}), (j\_2, be0\_\{j\_2\}), \ldots, (j\_k, be0\_\{j\_k\})$, and $g\_e1(0)$ of (k−1)th polynomial $g\_e1(x)$ on Z/pZ which passes through coordinates $(j\_1, be1\_\{j\_1\}), (j\_2, be1\_\{j\_2\}), \ldots, (j\_k, be1\_\{j\_k\})$. Specifically, $g\_e0(0)$ and $g\_e1(0)$ are calculated by a method which solves simultaneous equations, a method which uses Lagrange interpolation, or the like.

Falsity detection device 203 is applied with $g\_e0(x), g\_s(0), g\_e1(0)$ to determine whether or not $g\_0(x), g\_s(0), g\_e1(0)$ satisfy $g\_e0(x)+g\_s(0)*g\_e1(0)=0$. Falsity detection device 203 outputs $g\_s(0)$ when they satisfy the requirement, and outputs, for example, "T" as a symbol which indicates that falsity has been detected when they do not satisfy the requirement.

In the confidential information distribution system of the first example, the size of the confidential information is p, the size of the distributed information is p^3, and the false detection rate is (1−1/p).

Here, when the size of the confidential information is designated by s, and the falsity detection rate by (1−ϵ), the size of the distributed information can be represented by $s*(1/\epsilon)^2$.

The size of the distributed information is $((s−1)(k−1)/\epsilon+k)^2$ in the secret sharing scheme described in the aforementioned Non-Patent Document 2. Assuming, for example, k=2, p=2^80, ϵ=½^80, the size of the distributed information is approximately 2^240 in the first example, while the size of the distributed information is approximately 2^320 in the method described in Non-Patent Document 2.

It can be understood, therefore, that the confidential information distribution system of the first example can detect falsity, and provides the distributed information which is reduced in size as compared with the conventional method.

SECOND EXAMPLE

A second example is an example in which (Z/pZ)^N is used for a data set of confidential information, $H\_\{e\_0, e\_1\}(x\_1, x\_2, \ldots, x\_N)=e\_0-(x\_1*e\_1+x\_2*e\_1^2+ \ldots +x\_\{N−$ $1\}*e\_1^{\{N-1\}}+x\_N*e\_1^{\{N+1\}})$ is used as function set H when function specifying data is a set of elements $e\_0, e\_1$ of $Z/pZ$, and an input set comprises elements x $(x\_1, x\_2, \ldots, x\_N)$ of $(Z/pZ)^N$, and data indicative of an access structure of a (k,n) threshold scheme is used as access structure data of a linear secret sharing scheme. In this regard, $(Z/pZ)^N$ is an N-th expansion field (N is a positive integer) of a finite field for prime number p, and the use of addition in the expansion field is represented by "+"; subtraction by "−"; multiplication by "*"; and division by "/."

In check data generator 104 of the second example, function specifying data $a\_1, a\_2$, which satisfy $H\_\{a\_1, a\_2\}(x)=0$ can be randomly selected as check data for elements x of arbitrary $(Z/pZ)^N$.

Here, when arbitrary different elements of $(Z/pZ)^N$ are designated by $x\_1, x\_2$, arbitrary function specifying data are designated by $c\_1, c\_2$, and a function specifying data set of H is designated by K, $|\{b\_1, b\_2|b\_1, b\_2\ Z/pZ, H\_\{b\_1, b\_2\}(x-1)=0, H\_\{(b\_1+c\_1), (b\_2+c\_2)\}(x\_2)=0\}|/|\{b\_1, b\_2|b\_1, b\_2\ Z/pZ, H\_\{b\_1, b\_2\}(x\_1)=0\}|=(N+1)/p$ are established.

Data indicative of an access structure of the (k,n) threshold scheme is specifically comprised of k, n which are positive integers, and $\{i\_1, i\_2, \ldots, i\_n\}$ which comprises a set of elements of $Z/pZ$. However, assume that k, n, p satisfy $k \leq n \leq p-1$.

In this regard, assume that confidential information distributing device 103 and check data distributing device 104 distribution-code confidential information and check data using the (k,n) threshold scheme described in Non-Patent Document 1, and confidential information restoring device 201 and check data restoring device 202 restore confidential information and check data using a restoring method corresponding to the (k,n) threshold scheme.

Next, a description will be given of distributed information generator 102 and restoring device 200 of the second example.

Distributed information generator 102 of the second example is applied with access structure data k, n, $\{i\_1, i\_2, \ldots, i\_n\}$, and confidential information $s=(s\_1, s\_2, \ldots, s\_N)$.

Distributed information generator 102 randomly generates a (k−1)th polynomial which has a constant term of s on $GF(p^N)$ by using confidential information distributing device 103, based on access structure data k, n, $\{i\_1, i\_2, \ldots, i\_n\}$, and confidential information s. This (k−1)th polynomial is designated by $f\_s(x)$.

Confidential information distributing device 103 calculates $f\_s(i\_1), f\_s(i\_2), \ldots, f\_s(i\_n)$, and stores the calculation result in distributed confidential information storage device 303_$\{i\_1\}$ of storage device 301_$\{i\_1\}$, distributed confidential information storage device 303_$\{i\_2\}$ of storage device 301_$\{i\_2\}, \ldots$, distributed confidential information storage device 303_$\{i\_n\}$ of storage device 301_$\{i\_n\}$.

Check data generator 104 is applied with confidential information $s=(s\_1, s\_2, \ldots, s\_N)$, and randomly generates $e\_0$ and $e\_1$ which satisfy $e\_0-(s\_1*e\_1+s\_2*e\_1^2+,\ldots,+s\_\{N-1\}*e\_1^\{N-1\}+s\_N*e\_1^\{N+1\})=0$.

Check data distributing device 105 is applied with access structure data k, n, $\{i\_1, i\_2, \ldots, i\_n\}$ and $e\_0, e\_1$ which have been generated by check data generator 104, and randomly generates a (k−1)th polynomial which has a constant term of $e\_0$ on $Z/pZ$ and a (k−1)th polynomial which has a constant term of $e\_1$ on $Z/pZ$. They are designated by $f\_\{e\_0\}(x), f\_\{e-11\}(x)$.

Check data distributing device 105 calculates $f\_\{e\_0\}(i\_1), f\_\{e\_0\}(i\_2), \ldots, f\_\{e\_0\}(i\_n)$ and $f\_\{e\_1\}(i\_1), f\_\{e\_1\}(i\_2), \ldots, f\_\{e\_1\}(i\_n)$, and stores $(f\_\{e\_0\}(i\_1), f\_\{e\_1\}(i\_1))$ in distributed check data storage device 303_$\{i\_1\}$ of storage device 301_$\{i-1\}$; stores $(f\_\{e\_0\}(i\_1), f\_\{e\_1\}(i\_1))$ in distributed check data storage device 303_$\{i\_2\}$ of storage device 301_$\{i\_2\}; \ldots$; stores $(f\_\{e\_0\}(i\_1), f\_\{e\_1\}(i\_1))$ in distributed check data storage device 303_$\{i\_n\}$ of storage device 301_$\{i\_n\}$.

On the other hand, restoring device 200 of the second example is applied with access structure data k, n, $\{i\_1, i\_2, \ldots, i\_n\}$.

Confidential information restoring device 201 reads data from each distributed confidential information storage device 302 of storage devices 301_$\{j\_1\}$, 301_$\{j\_2\}, \ldots$, 301_$\{j\_k\}$. These data are designated by $bs\_\{j\_1\}, bs\_\{j\_2\}, \ldots, bs\_\{j\_k\}$, Confidential information restoring device 201 is applied with $(j\_1, bs\_\{j\_1\}), (j\_2, bs\_\{j\_2\}), \ldots, (j\_k, bs\_\{j\_k\})$ read from distributed confidential information storage device 302, and generates $g\_s(0)$ of (k−1)th polynomial $g\_s(x)$ on $GF(p^N)$ which passes through coordinates $(j\_1, bs\_\{j\_1\}), (j\_2, bs\_\{j\_2\}), \ldots, (j\_k, bs\_\{j\_k\})$. Specifically, $g\_s(0)$ is calculated by a method which solves simultaneous equations, a method which uses Lagrange interpolation, or the like. Here, this $g\_s(0)$ is regarded as elements of $(Z/pZ)^N$, and is designated by $(gs1, gs2, \ldots, gsN)$.

Check data restoring device 202 reads data from each distributed check data storage device 303 of storage devices 301_$\{j-1\}$, 301_$\{j\_2\}, \ldots$, 301_$\{j\_k\}$. They are designated by $(be0\_\{j\_1\}, be1\_\{j\_1\}), (be0\_\{j\_2\}, be1\_\{j\_2\}), \ldots, (be0\_\{j\_k\}, be1\_\{j\_k\})$.

Check data restoring device 202 is applied with $(j\_1, be0\_\{j\_1\}, be1\_\{j\_1\}), (j\_2, be0\_\{j\_2\}, be1\_\{j\_2\}), \ldots, (j\_k, be0\_\{j\_k\}, be1\_\{j\_k\})$, and generates $g\_e0(0)$ of (k−1)th polynomial $g\_e0(x)$ on $Z/pZ$ which passes through coordinates $j\_1, be0\_\{j\_1\}), (j\_2, be0\_\{j\_2\}), \ldots, (j\_k, be0\_\{j\_k\})$, and $g\_e1(0)$ of (k−1)th polynomial $g\_e1(x)$ on $Z/pZ$ which passes through coordinates $(j\_1, be1\_\{j\_1\}), (j\_2, be1\_\{j\_2\}), \ldots, (j\_k, be1\_1\{j\_k\})$.

Specifically, $g\_e0(x)$ and $g\_e1(x)$ are calculated by a method which solves simultaneous equations, a method which uses Lagrange interpolation, or the like.

Next, falsity detection device 203 is applied with $g\_s(0), g\_e0(0), g\_e1(0)$ to determine whether or not $g\_s(0), g\_e0(0), g\_e1(0)$ satisfy $g\_e0(0)-(gs1*g\_e1(0)+gs2*g\_el(0)^2+,\ldots,+gs\{N-1\}*g\_e1(0)^\{N-1\}+gsN*g\_e1(0)^\{N+1\})=0$. Falsity detection device 203 outputs $g\_s(0)$ when they satisfy the requirement, and outputs, for example, "T" as a symbol which indicates that falsity has been detected when they do not satisfy the requirement.

In the confidential information distribution system of the second example, the size of the confidential information is $p^N$, the size of the distributed information is $p^(N+2)$, and a false detection rate is $(1-(N+1)/p)$.

Here, when the size of the confidential information is designated by s, and the falsity detection rate by $(1-\epsilon)$, the size of the distributed information can be represented by $s*(1/\epsilon)^2*(1+\log\_ps)^2$.

The size of the distributed information is $((s-1)(k-1)/\square+k)^2$ in the secret sharing scheme described in the aforementioned Non-Patent Document 2. Assuming, for example, k=2, p=2^90, N=10, $\epsilon=\frac{1}{2}^80$, the size of the distributed information is approximately $2^{90180}$ in the second example, while the size of the distributed information is approximately $2^{180160}$ in the secret sharing scheme described in Non-Patent Document 2.

It can be understood, therefore, that the confidential information distribution system of the second example can detect falsity, and provides the distributed information which is reduced in size as compared with the conventional method.

THIRD EXAMPLE

A third example is an example in which $(Z/pZ)^N$ is used for a data set of confidential information, $H\_\{e\_0, e\_1\}(x\_1, x\_2, \ldots, x\_N) = e\_0 - (x\_1*e\_1 + x\_2*e\_1^2 + \ldots + x\_N*e\_1^N + e\_1^{(N+1)} + e\_1^{(N+2)} + e\_1^{(N+4)})$ is used as function set H when function specifying data is a set of elements $e\_0, e\_1$ of $Z/pZ$, and an input set comprises elements $(x\_1, x\_2 \ldots, x\_N)$ of $(Z/pZ)^N$, and data indicative of an access structure of a (k,n) threshold scheme is used as access structure data of a linear secret sharing scheme. In this regard, like the second example, $(Z/pZ)^N$ is an N-th expansion field (N is a positive integer) of a finite field for prime number p, and the use of addition in the expansion field is represented by "+"; subtraction by "−"; multiplication by "*"; and division by "/."

In check data generator 104 of the third example, function specifying data a\_1, a\_2, which satisfy $H\_\{a\_1, a\_2\}(x) = 0$ can be randomly selected as check data for elements x of arbitrary $(Z/pZ)^N$.

Here, when arbitrary elements of $(Z/pZ)^N$ are designated by x\_1, x\_2, an arbitrary positive integer is designated by a, arbitrary function specifying data are designated by c\_1, c\_2, and a function specifying data set of H is designated by K, $|\{b\_1, b\_2|b\_1, b\_2 \in Z/pZ, H\_\{b\_1, b\_2\}(x-1) = 0, H\_\{(a*b\_1+c\_1), (a*b\_2+c\_2)\}(x\_2) = 0\}|/|\{b\_1, b\_2|b\_1, b\_2 \in Z/pZ, H\_\{b\_1, b\_2\}(x\_1) = 0\}| = N/p$ are established.

Data indicative of an access structure of the (k,n) threshold scheme is specifically comprised of k, n which are positive integers, and $\{i\_1, i\_2, \ldots, i\_n\}$ which comprises a set of elements of $Z/pZ$. However, assume that k, n, p satisfy $k \leq n \leq p-1$.

In this regard, assume that confidential information distributing device 103 and check data distributing device 104 distribution-code confidential information and check data using the (k,n) threshold scheme described in Non-Patent Document 1, and that confidential information restoring device 201 and check data restoring device 202 restore confidential information and check data using a restoring method corresponding to the (k,n) threshold scheme.

Next, a description will be given of distributed information generator 102 and restoring device 200 of the third example.

Distributed information generator 102 of the third example is applied with access structure data k, n, $\{i\_1, i\_2, \ldots, i\_n\}$, and confidential information $s = (s\_1, s\_2, \ldots, s\_N)$.

Distributed information generator 102 randomly generates a (k−1)th polynomial which has a constant term of s on $GF(P^N)$ by using confidential information distributing device 103, based on access structure data k, n, $\{i\_1, i\_2, \ldots, i\_n\}$, and confidential information s. This (k−1)th polynomial is designated by f\_s(x).

Confidential information distributing device 103 calculates $f\_s(i\_1), f\_s(i\_2), \ldots, f\_s(i\_n)$, and stores the calculation result in distributed confidential information storage device 303$\{i\_1\}$ of storage device 301\_$\{i\_1\}$, distributed confidential information storage device 303\_$\{i\_2\}$ of storage device 301\_$\{i\_2\}$, ..., distributed confidential information storage device 303\_$\{i\_n\}$ of storage device 301\_$\{i\_n\}$.

Check data generator 104 is applied with confidential information $s = (s\_1, s\_2, \ldots, s\_N)$, and randomly generates elements e\_0 and e\_1 of $Z/pZ$ which satisfy $e\_0 - (s\_1*e\_1 + s\_2*e\_1^2 + \ldots + s\_N*e\_1^N + e\_1^{(N+1)} + e\_1^{(N+2)} + e\_1^{(N+4)}) = 0$.

Check data distributing device 105 is applied with access structure data k, n, $\{i\_1, i\_2, \ldots, i\_n\}$ and e\_0, e\_1 which have been generated by check data generator 104, and randomly generates a (k−1)th polynomial which has a constant term of e\_0 on $Z/pZ$ and a (k−1)th polynomial which has a constant term of e\_1 on $Z/pZ$. They are designated by $f\_\{e\_0\}(x), f\_\{e-1\}(x)$.

Check data distributing device 105 calculates $f\_\{e\_0\}(i\_1), f\{e\_0\}(i\_2), \ldots, f\_\{e\_0\}(i\_n)$ and $f\_\{e\_1\}(i\_1), f\_\{e\_1\}(i\_2, \ldots, f\_\{e\_1\}(i\_n)$, and stores $(f\{e\_0\}(i\_1), f\_\{e\_1\}(i\_1))$ in distributed check data storage device 302\_$\{i\_1\}$ of storage device 301\_$\{i\_1\}$; stores $(f\{e\_0\}(i\_1), f\_\{e\_1\}(i\_1))$ in distributed check data storage device 302\_$\{i\_2\}$ of storage device 301\_$\{i\_2\}$; ...; stores $(f\_\{e\_0\}(i\_1), f\_\{e\_1\}(i\_1))$ in distributed check data storage device 302\_$\{i\_n\}$ of storage device 301\_$\{i\_n\}$.

On the other hand, restoring device 200 of the third example is applied with access structure data k, n, $\{i\_1, i\_2, \ldots, i\_n\}$.

Confidential information restoring device 201 reads data from each distributed confidential information storage device 302 of storage devices 301\_$\{j\_1\}$, 301\_$\{j\_2\}$, ..., 301\_$\{j\_k\}$. These data are designated by bs\_$\{j\_1\}$, bs\_$\{j\_2\}$, ..., bs\_$\{j\_k\}$, Confidential information restoring device 201 is applied with $(j\_1, bs\_\{j\_1\}), (j\_2, bs\_\{j\_2\}), \ldots, (j\_k, bs\_\{j\_k\}$ read from distributed confidential information storage device 302, and generates g\_s(0) of (k−1)th polynomial g\_s(0) on $GF(p^N)$ which passes through coordinates $j\_1, bs\_\{j\_1\}), (j\_2, bs\_\{j\_2\}), \ldots, (j\_k, bs\_\{j\_k\})$. Specifically, g\_s(0) is calculated by a method which solves simultaneous equations, a method which uses Lagrange interpolation, or the like. Here, this g\_s(0) is regarded as elements of $(Z/pZ)^N$, and is designated by (gs1, gs2, ..., gsN).

Check data restoring device 202 reads data from each distributed check data storage device 303 of storage devices 301\_$\{j\_1\}$, 301\_$\{j\_2\})$, ..., 301\_$\{j\_k\}$. They are designated by $(be0\_\{j\_1\}, be1\_\{j\_1\}), (be0\_\{j\_2\}, be1\_\{j\_2\}), \ldots, (be0\_\{j\_k\}, be1\_\{j\_k\})$.

Check data restoring device 202 is applied with $(j\_1, be0\_\{j\_1\}, be1\_\{j\_1\}), (j\_2, be0\_\{j\_2\}, be1\_\{j\_2\}), \ldots, (j\_k, be0\_\{j\_k\}, be1\_\{j\_k\})$, and generates g\_e(0) of (k−1)th polynomial g\_e0(x) on $Z/pZ$ which passes through coordinates $(j\_1, be0\_U\{j\_1\}), (j\_2, be0\_\{j\_2\}), \ldots, (j\_k, be0\_\{j\_k\})$, and g\_e1(0) of (k−1)th polynomial g\_e1(x) on $Z/pZ$ which passes through coordinates $(j\_1, be1\_\{j\_1\}), (j\_2, be1\_\{j\_2\}), \ldots, (j\_k, be1\_\{j\_k\})$.

Specifically, g\_e0(x) and g\_e1(x) are calculated by a method which solves simultaneous equations, a method which uses Lagrange interpolation, or the like.

Next, falsity detection device 203 is applied with g\_s(0), g\_e0(0), g\_e1(0) to determine whether or not g\_s(0), g\_e0(0), g\_e1(0) satisfy $g\_e0(0) - gs1*g\_e1(0) + gs2*g\_e1(0)^2 + \ldots + gsN*g\_e1(0)^N + g\_el(0)^{(N+1)} + g\_el(0)^{(N+2)} + g\_el(0)^{(N+4)}) = 0$. Falsity detection device 203 outputs g\_s(0) when they satisfy the requirement, and outputs, for example, "T" as a symbol which indicates that falsity has been detected when they do not satisfy the requirement.

In the confidential information distribution system of the third example, the size of the confidential information is $p^N$, the size of the distributed information is $p^{(N+2)}$, and the false detection rate is $(1-(N+3)/p)$.

The confidential information distribution system of the third example can detect falsity which is not assumed in the first example and second example. Specifically, the first example and second example can detect tampered be0\_$\{j\}$ and be1\_$\{j\}$ among information $(j, be0\_\{j\}, be1\_\{j\})$ stored in distribution checking storage data device 303, and do not assume tampered j. J is data corresponding to storage device 301_j, and is comparable to the identifier of the storage device, so that tampered j can be regarded as falsity corresponding to spoofing of the storage device. The third example is characterized by the ability to detect aforementioned tampered j, and a system capable of detecting falsity to spoofing can be built in accordance with the third example.

The invention claimed is:

1. A distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k for uniquely specifying elements of function set H which satisfy $H\_k(x)=y$,
wherein said function set H satisfies $|\{b|b \in K, H\_b(x\_1)=y, H\_\{b+c\}(x\_2)=y\}|/|\{b|b \in K, H\_b(x\_1)=y\}| < \delta$ for arbitrary elements x_1 and x_2 of said confidential information data set S which differ from each other, and arbitrary function specifying data c of said function set H,
where K designates a set of said function specifying data, and $(1-\delta)$ designates a falsity detection probability.

2. The distributed information generator according to claim 1, wherein said check data generator:
employs $(Z/pZ)^N$ as confidential information data set S, where N is a positive value, and p is a prime number; and
randomly selects e_0 and e_1 of Z/pZ which satisfy $e\_0-(x\_1*e\_1+x\_2*e\_1^2+ \ldots +x\_\{N-1\}*e\_1^\{N-1\}+x\_\{N\}*e\_1^\{N+1\})=0$ for elements (x_1, x_2, ..., x_N) of said confidential information data set S, and outputs the same as said check data.

3. The distributed information generator according to claim 1, wherein said check data generator:
employs $(Z/pZ)^N$ as confidential information data set, where N is a positive integer, and p is a prime number; and
randomly selects e_0 and e_1 of Z/pZ which satisfy $e\_0-(x\_1*e\_1+x\_2*e\_1^2+ \ldots +x\_N*e\_1^N+e\_1^\{(N+1)\}+e\_1^\{(N+2)\}+e\_1^\{(N+4)\})=0$, for elements (x_1, x_2, ..., x_N) of said confidential information data set S, and outputs the same as said check data.

4. A restoring device comprising:
a storage device storing confidential information distribution-coded in accordance with an access structure data indicative of an access structure of a linear secret sharing scheme, and distribution-coded data of check data generated to correspond with said confidential information;
a confidential information restoring device reading distribution-coded confidential information from said storage device corresponding to an access set of said access structure to restore said confidential information in accordance with said access structure data;
a check data restoring device reading distribution-coded check data from said storage device corresponding to the access set of said access structure to restore said check data in accordance with said access structure data; and
a falsity detection device outputting restored confidential information when check data restored by said check data restoring device corresponds to confidential information restored by said confidential information restoring device, and outputting a signal indicative of falsity when the restored check data does not correspond to the restored confidential information,
wherein when arbitrary different elements of input set S, which are input as said confidential information, are x_1 and x_2: an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{b+c\}(x\_2)=y\}|/|\{b|b \in K, H\_b(x\_1)=y\}| \leq \delta$, wherein:
said falsity detection device determines that the check data restored by said check data restoring device corresponds to the confidential information restored by said confidential information restoring device, when said function specifying data k which is the restored check data and restored confidential information x satisfy $H\_k(x)=y$.

5. The restoring device according to claim 4, wherein:
when N is an integer, and p is a prime number; and
when said function specifying data e_0, e_1 which are restored check data and which are elements of Z/pZ, and when (x_1, x_2, ..., x_N) which are restored confidential information and which are elements of $(Z/pZ)^N$ satisfy $e\_0-(x\_1*e\_1+x\_2*e\_1^2+ \ldots +x\_\{N-1\}*e\_1^\{N-1\}+x\_N*e\_1^\{N+1\})=0$, said falsity detection device determines that the check data restored by said check data restoring device correspond to the confidential information restored by said confidential information restoring device.

6. The restoring device according to claim 4, wherein:
when N is an integer, and p is a prime number; and
when said function specifying data e_0, e_1 which are restored check data and which are elements of Z/pZ, and when (x_1, x_2, ..., x_N) which are restored confidential information and which are elements of $(Z/pZ)^N$ satisfy $e\_0-(x\_1*e\_1+x\_2*e\_1^2+ \ldots +x\_N*e\_1^N+e\_1^\{(N+1)\}+e\_1^\{(N+2)\}+e\_1^\{(N+4)\})=0$, said falsity detection device determines that the check data restored by said check data restoring device corresponds to the confidential information restored by said confidential information restoring device.

7. A confidential information distribution system comprising:
a distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k for uniquely specifying elements of function set H which satisfy $H\_k(x)=y$, wherein said function set H satisfies $|\{b|b\in K, H\_b(x\_1)=y, H\_\{b+c\}(x\_2)=y\}|/|\{b|b\in K, H\_b(x\_1)=y\}|<\delta$ for arbitrary elements x_1 and x_2 of said confidential information data set S which differ from each other, and arbitrary function specifying data c of said function set H, where K designates a set of said function specifying data, and (1−δ) designates a falsity detection probability; and a restoring device comprising:

a storage device storing confidential information distribution-coded in accordance with an access structure data indicative of an access structure of a linear secret sharing scheme, and distribution-coded data of check data generated to correspond with said confidential information;

a confidential information restoring device reading distribution-coded confidential information from said storage device corresponding to an access set of said access structure to restore said confidential information in accordance with said access structure data;

a check data restoring device reading distribution-coded check data from said storage device corresponding to the access set of said access structure to restore said check data in accordance with said access structure data; and a falsity detection device outputting restored confidential information when check data restored by said check data restoring device corresponds to confidential information restored by said confidential information restoring device, and outputting a signal indicative of falsity when the restored check data does not correspond to the restored confidential information, wherein when arbitrary different elements of input set S, which are input as said confidential information, are x_1 and x_2: an arbitrary function specifying data which is data for uniformly specifying elements of function set H is c; a set of said function specifying data is K; a falsity detection probability is (1−δ), H satisfies $|\{b|b\in K, H\_b(x\_1)=y, H\_\{b+c\}(x\_2)=y\}|/|\{b|b\in K, H\_b(x\_1)=y\}|\leq \delta$, wherein:

said falsity detection device determines that the check data restored by said check data restoring device corresponds to the confidential information restored by said confidential information restoring device, when said function specifying data k which is the restored check data and restored confidential information x satisfy $H\_k(x)=y$.

8. A confidential information distribution system comprising:

a distributed information generator comprising:

a check data generator generating check data corresponding to confidential information;

a confidential information distributing device distribution-coding the confidential information in accordance with access structure data indicative of an access structure of a linear secret sharing scheme; and a check data distributing device distribution-coding the check data in accordance with access structure data indicative of the same access structure as the access structure in accordance with which the confidential information is distribution-coded, wherein said check data generator is:

a device which is applied with elements s of confidential information data set S; and randomly selects and outputs function specifying data k for uniquely specifying elements of function set H which satisfy $H\_k(x)=y$, wherein said function set H satisfies $|\{b|b\in K, H\_b(x\_1)=y, H\_\{b+c\}(x\_2)=y\}|/|\{b|b\in K, H\_b(x\_1)=y\}|<\delta$ for arbitrary elements x_1 and x_2 of said confidential information data set S which differ from each other, and arbitrary function specifying data c of said function set H, where K designates a set of said function specifying data, and (1−δ) designates a falsity detection probability;

wherein said check data generator:

employs $(Z/pZ)^N$ as confidential information data set S, where N is a positive value, and p is a prime number; and randomly selects e_0 and e_1 of Z/pZ which satisfy $e\_0-(x\_1*e\_1+x\_2*e\_1^2+ \ldots +x\_\{N-1\}*e\_1^\{N-1\}+x\_\{N\}*e\_1^\{N+1\})=0$ for elements (x_1, x__2, . . . , x_N) of said confidential information data set S, and outputs the same as said check data; and a restoring device comprising:

a storage device storing confidential information distribution-coded in accordance with an access structure data indicative of an access structure of a linear secret sharing scheme, and distribution-coded data of check data generated to correspond with said confidential information;

a confidential information restoring device reading distribution-coded confidential information from said storage device corresponding to an access set of said access structure to restore said confidential information in accordance with said access structure data;

a check data restoring device reading distribution-coded check data from said storage device corresponding to the access set of said access structure to restore said check data in accordance with said access structure data; and a falsity detection device outputting restored confidential information when check data restored by said check data restoring device corresponds to confidential information restored by said confidential information restoring device, and outputting a signal indicative of falsity when the restored check data does not correspond to the restored confidential information, wherein when arbitrary different elements of input set S, which are input as said confidential information, are x_1 and x_2: an arbitrary function specifying data which is data for uniformly specifying elements of function set H is c; a set of said function specifying data is K; a falsity detection probability is (1−δ), H satisfies $|\{b|b\in K, H\_b(x\_1)=y, H\_\{b+c\}(x\_2)=y\}|/|\{b|b\in K, H\_b(x\_1)=y\}|\leq \delta$, wherein:

said falsity detection device determines that the check data restored by said check data restoring device corresponds to the confidential information restored by said confidential information restoring device, when said function specifying data k which is the restored check data and restored confidential information x satisfy $H\_k(x)=y$, wherein:

when N is an integer, and p is a prime number; and when said function specifying data e_0, e_1 which are restored check data and which are elements of Z/pZ, and when (x_1, x_2, . . . , x_N) which are restored confidential information and which are elements of $(Z/pZ)^N$ satisfy $e\_0-(x\_1*e\_1+x\_2*e\_1^2+ \ldots +x\_\{N-1\}*e\_1^\{N-1\}+x\_N*e\_1^\{N+1\})=0$, said falsity detection device determines that the check data restored by said check data restoring device correspond to the confidential information restored by said confidential information restoring device.

9. A non-transitory computer-readable recording medium storing a program which causes a computer to:

generate check data corresponding to confidential information;

distribution-code said confidential information in accordance with access structure data indicative of an access structure of a linear secret sharing scheme, and store the coded confidential information in a storage device; and distribution-code the check data in accordance with access structure data indicative of the same access structure as the access structure in accordance with which the confidential information is distribution-coded, and store the coded check data in the storage device, said program further causing the computer to:

receive elements s of confidential information data set S; and randomly select function specifying data k for uniquely specifying elements of function set H which satisfy $H\_k(x)=y$, and to output the same as said check data, wherein:

said function set H satisfies $|\{b|b \in K, H\_b(x\_1)=y, H\_\{b+c\}(x\_2)=y\}|/|\{b|b \in K, H\_b(x\_1)=y\}| \leq \delta$ for arbitrary elements $x\_1$ and $x\_2$ of said confidential information data set S which differ from each other, and arbitrary function specifying data c of said function set H, where K designates a set of said function specifying data, and $(1-\delta)$ designates a falsity detection probability.

10. The non-transitory computer-readable recording medium according to claim 9, wherein said program:

employs $(Z/pZ)^N$ as confidential information data set S, where N is a positive value, and p is a prime number; and causes the computer to randomly select elements $e\_0$ and $e\_1$ of Z/pZ which satisfy $e\_0-(x\_1*e\_1+x\_2*e\_1^2+ \ldots x\_\{N-1\}*e\_1^\{N-1\}+x\_N*e\_1^\{N+1\})=0$ for elements $(x\_1, x\_2, \ldots, x\_N)$ of said confidential information data set S, and output the same as said check data.

11. The non-transitory computer-readable recording medium according to claim 9, wherein:

$(Z/pZ)^N$ is employed as confidential information data set S, where N is a positive value, and p is a prime number; and said program further causes the computer to randomly select elements $e\_0$ and $e\_1$ of Z/pZ which satisfy $e\_0-(x\_1*e\_1+x\_2*e\_1^2+ \ldots +x\_N*e\_1^N+e\_1^\{N+1\}+e\_1^\{N+2\}+e\_1^\{N+4\})=0$, for elements $x\_1$ and $x\_2$ of said confidential information data set S, and output the same as said check data.

12. A non-transitory computer-readable recording medium storing a program which causes a computer to:

read distribution-coded confidential information from a storage device for storing confidential information distribution-coded in accordance with an access structure data indicative of an access structure of a linear secret sharing scheme, said distribution-coded confidential information corresponding to an access set of said access structure, and restore said confidential information in accordance with said access structure data;

read distribution-coded check data from a storage device for storing distribution-coded data of check data generated to correspond with said confidential information, said distribution-coded check data corresponding to the access set of said access structure, and restore said check data in accordance with said access structure data; and output said restored confidential information when said restored check data corresponds to said restored confidential information, and output a signal indicative of falsity when said restored check data does not corresponds to said restored confidential information, wherein when arbitrary different elements of input set S input as said confidential information are $x\_1$ and $x\_2$:

an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{b+c\}(x\_2)=y\}|/|\{b|b \in K, H\_b(x\_1)=y\}| \leq \delta$, wherein:

said program causes the computer to determine that said restored check data correspond to said restored confidential information, when said function specifying data k which is the restored check data and restored confidential information x satisfy $H\_k(x)=y$.

13. The non-transitory computer-readable recording medium according to claim 12, wherein:

when N is a positive value, and p is a prime number; and when said function specifying data $e\_0, e\_1$ which are restored check data and which are elements of Z/pZ, and when $(x\_1, x\_2, \ldots, x\_N)$ which are restored confidential information and which are elements of $(Z/pZ)^N$ satisfy $e\_0-(x\_1*e\_1+x\_2*e\_1^2+ \ldots +x\_\{N-1\}*e\_1^\{N-1\}+x\_N*e\_1^\{N+1\})=0$, said program causes the computer to determine that said restored check data correspond to said restored confidential information.

14. The non-transitory computer-readable recording medium according to claim 12, wherein:

when N is a positive value, and p is a prime number; and when said function specifying data $e\_0, e\_1$ which are restored data check data and which are elements of Z/pZ, and when $(x\_1, x\_2, \ldots, x\_N)$ which are restored confidential information and which are elements of $(Z/pZ)^N$ satisfy $e\_0-(x\_1*e\_1+x\_2*e\_1^2+ \ldots +x\_N*e\_1^N+e\_1^\{N+1\}+e\_1^\{N+2\}+e\_1^\{N+4\})=0$, said program causes the computer to determine that said restored check data correspond to said restored confidential information.

15. A non-transitory computer-readable recording medium storing a program, said program comprising:

a program which causes a computer to:

generate check data corresponding to confidential information;

distribution-code said confidential information in accordance with access structure data indicative of an access structure of a linear secret sharing scheme, and store the coded confidential information in a storage device; and distribution-code the check data in accordance with access structure data indicative of the same access structure as the access structure in accordance with which the confidential information is distribution-coded, and store the coded check data in the storage device, said program further causing the computer to:

receive elements s of confidential information data set S; and randomly select function specifying data k for uniquely specifying elements of function set H which satisfy $H\_k(x)=y$, and to output the same as said check data, wherein:

said function set H satisfies $|\{b|b \in K, H\_b(x\_1)=y, H\_\{b+c\}(x\_2)=y\}|/|\{b|b \in K, H\_b(x\_1)=y\}| \leq \delta$ for arbitrary elements $x\_1$ and $x\_2$ of said confidential information data set S which differ from each other, and arbitrary function specifying data c of said function set H, where K designates a set of said function specifying data, and $(1-\delta)$ designates a falsity detection probability; and a program which causes a computer to:

read distribution-coded confidential information from a storage device for storing confidential information distribution-coded in accordance with an access structure data indicative of an access structure of a linear secret sharing scheme, said distribution-coded confidential information corresponding to an access set of said access structure, and restore said confidential information in accordance with said access structure data;

read distribution-coded check data from a storage device for storing distribution-coded data of check data generated to correspond with said confidential information, said distribution-coded check data corresponding to the access set of said access structure, and restore said check data in accordance with said access structure data; and output said restored confidential information when said restored check data corresponds to said restored confidential information, and output a signal indicative of falsity when said restored check data does not corresponds to said restored confidential information, wherein when arbitrary different elements of input set S input as said confidential information are $x\_1$ and $x\_2$: an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{b+c\}(x\_2)=y\}|/|\{b|b \in K, H\_b(x\_1)=y\}| \leq \delta$, wherein:

said program causes the computer to determine that said restored check data correspond to said restored confidential information, when said function specifying data k which is the restored check data and restored confidential information x satisfy $H\_k(x)=y$.

16. A non-transitory computer-readable recording medium storing a program, said program comprising:
a program which causes a computer to:
generate check data corresponding to confidential information;
distribution-code said confidential information in accordance with access structure data indicative of an access structure of a linear secret sharing scheme, and store the coded confidential information in a storage device; and
distribution-code the check data in accordance with access structure data indicative of the same access structure as the access structure in accordance with which the confidential information is distribution-coded, and store the coded check data in the storage device,
said program further causing the computer to:
receive elements s of confidential information data set S; and
randomly select function specifying data k for uniquely specifying elements of function set H which satisfy $H\_k(x)=y$, and to output the same as said check data, wherein:
said function set H satisfies $|\{b|b \in K, H\_b(x\_1)=y, H\_\{b+c\}(x\_2)=y\}|/|\{b|b \in K, H\_b(x\_1)=y\}| \leq \delta$ for arbitrary elements $x\_1$ and $x\_2$ of said confidential information data set S which differ from each other, and arbitrary function specifying data c of said function set H,
where K designates a set of said function specifying data, and $(1-\delta)$ designates a falsity detection probability;
wherein said program:
employs $(Z/pZ)^\wedge N$ as confidential information data set S, where N is a positive value, and p is a prime number; and
causes the computer to randomly select elements $e\_0$ and $e\_1$ of $Z/pZ$ which satisfy $e\_0-(x\_1*e\_1+x\_2*e\_1^\wedge 2+ \ldots x\_\{N-1\}*e\_1^\wedge\{N-1\}+x\_N*e\_1^\wedge\{N+1\})=0$ for elements $(x\_1, x\_2, \ldots, x\_N)$ of said confidential information data set S, and output the same as said check data; and
a program which causes a computer to:
read distribution-coded confidential information from a storage device for storing confidential information distribution-coded in accordance with an access structure data indicative of an access structure of a linear secret sharing scheme, said distribution-coded confidential information corresponding to an access set of said access structure, and restore said confidential information in accordance with said access structure data;

read distribution-coded check data from a storage device for storing distribution-coded data of check data generated to correspond with said confidential information, said distribution-coded check data corresponding to the access set of said access structure, and restore said check data in accordance with said access structure data; and output said restored confidential information when said restored check data corresponds to said restored confidential information, and output a signal indicative of falsity when said restored check data does not corresponds to said restored confidential information, wherein when arbitrary different elements of input set S input as said confidential information are $x\_1$ and $x\_{\_2}$: an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{b+c\}(x\_2)=y\}|/|\{b|b \in K, H\_b(x\_1)=y\}| \leq \delta$, wherein:

said program causes the computer to determine that said restored check data correspond to said restored confidential information, when said function specifying data k which is the restored check data and restored confidential information x satisfy $H\_k(x)=y$, wherein:
when N is a positive value, and p is a prime number; and
when said function specifying data $e\_0$, $e\_1$ which are restored check data and which are elements of $Z/pZ$, and when $(x\_1, x\_2, \ldots, x\_N)$ which are restored confidential information and which are elements of $(Z/pZ)^\wedge N$ satisfy $e\_0-(x\_1*e\_1+x\_2*e\_1^\wedge 2+ \ldots +x\_\{N-1\}*e\_1^\wedge\{N-1\}+x\_N*e\_1^\wedge\{N+1\})=0$, said program causes the computer to determine that said restored check data correspond to said restored confidential information.

17. A distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k uniquely specifying elements of function set H which satisfy $H\_k(x)=y$,
wherein said function set H satisfies $|\{b|b \in K, H\_b(x\_1)=y, H\_\{a*b+c\}(x\_2)=y\}|/|\{b|b \in K, H\_b(x\_1)=y\}| \leq \delta$ for arbitrary elements $x\_1$ and $x\_2$ of said confidential information data set S which differ from each other, and arbitrary function specifying data c of said function set H, where a is an arbitrary positive integer,
where K designates a set of said function specifying data, and $(1-\delta)$ designates a falsity detection probability.

18. The distributed information generator according to claim 17, wherein an access structure of a(k,n) threshold scheme is used as the access structure of the secret sharing scheme.

19. A restoring device comprising:
a storage device storing confidential information distribution-coded in accordance with access structure data indicative of an access structure of a linear secret sharing scheme, and distribution-coded data of check data generated to correspond with said confidential information;
a confidential information restoring device reading distribution-coded confidential information from said storage device corresponding to an access set of said access structure to restore said confidential information in accordance with said access structure data;
a check data restoring device reading distribution-coded check data from said storage device corresponding to the access set of said access structure to restore said check data in accordance with said access structure data; and
a falsity detection device outputting restored confidential information when check data restored by said check data restoring device correspond to confidential information restored by said confidential information restoring device, and outputting a signal indicative of falsity when the restored check data does not correspond to the restored confidential information,
wherein when arbitrary different elements of input set S input as said confidential information are x_1 and x_2: an arbitrary positive integer is a; an arbitrary function specifying data which is data for uniformly specifying elements of function set H is c; a set of said function specifying data is K; a falsity detection probability is $(1-\delta)$, H satisfies $|\{b|b\epsilon K, H\_b(x\_1)=y, H\_\{a*b+c\}(x\_2)=y\}|/|\{b|b\epsilon K, H\_b(x\_1)=y\}|\leq\delta$, wherein:
said falsity detection device determines that the check data restored by said check data restoring device correspond to the confidential information restored by said confidential information restoring device, when said function specifying data k which is the restored check data and restored confidential information x satisfy H_k(x)=y.

20. The restoring device according to claim 19, wherein an access structure of a(k,n) threshold scheme is used as the access structure of said secret sharing scheme.

21. A confidential information distribution system comprising:
a distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k uniquely specifying elements of function set H which satisfy H_k(x)=y,
wherein said function set H satisfies $|\{b|b\epsilon K, H\_b(x\_1)=y, H\_\{a*b+c\}(x\_2)=y\}|/|\{b|b\epsilon K, H\_b(x\_1)=y\}|\leq\delta$ for arbitrary elements x_1 and x_2 of said confidential information data set S which differ from each other, and arbitrary function specifying data c of said function set H, where a is an arbitrary positive integer,
where K designates a set of said function specifying data, and $(1-\delta)$ designates a falsity detection probability; and
a restoring device comprising:
a storage device storing confidential information distribution-coded in accordance with access structure data indicative of an access structure of a linear secret sharing scheme, and distribution-coded data of check data generated to correspond with said confidential information;
a confidential information restoring device reading distribution-coded confidential information from said storage device corresponding to an access set of said access structure to restore said confidential information in accordance with said access structure data;
a check data restoring device reading distribution-coded check data from said storage device corresponding to the access set of said access structure to restore said check data in accordance with said access structure data; and
a falsity detection device outputting restored confidential information when check data restored by said check data restoring device correspond to confidential information restored by said confidential information restoring device, and outputting a signal indicative of falsity when the restored check data does not correspond to the restored confidential information,
wherein when arbitrary different elements of input set S input as said confidential information are x_1 and x_2: an arbitrary positive integer is a; an arbitrary function specifying data which is data for uniformly specifying elements of function set H is c; a set of said function specifying data is K; a falsity detection probability is $(1-\delta)$, H satisfies $|\{b|b\epsilon K, H\_b(x\_1)=y, H\_\{a*b+c\}(x\_2)=y\}|/|\{b|b\epsilon K, H\_b(x\_1)=y\}|\leq\delta$, wherein:
said falsity detection device determines that the check data restored by said check data restoring device correspond to the confidential information restored by said confidential information restoring device, when said function specifying data k which is the restored check data and restored confidential information x satisfy H_k(x)=y.

22. A confidential information distribution system comprising:
a distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k uniquely specifying elements of function set H which satisfy H_k(x)=y,
wherein said function set H satisfies $|\{b|b\epsilon K, H\_b(x\_1)=y, H\_\{a*b+c\}(x\_2)=y\}|/|\{b|b\epsilon K, H\_b(x\_1)=y\}|\leq\delta$ arbitrary elements x_1 and x_2 of said confidential information data set S which differ from each other, and arbitrary function specifying data c of said function set H, where a is an arbitrary positive integer,
where K designates a set of said function specifying data, and $(1-\delta)$ designates a falsity detection probability;
wherein said check data generator:
employs $(Z/pZ)^N$ as confidential information data set, where N is a positive integer, and p is a prime number; and
randomly selects $e\_0$ and $e\_1$ of Z/pZ which satisfy $e\_0-(x\_1*e\_1+x\_2*e\_1^2+ \ldots +x\_N*e\_1^N+e\_1^{(N+1)}+e\_1^{(N+2)}+e\_1^{(N+4)})=0$, for elements $(x\_1, x\_2, \ldots, x\_N)$ of said confidential information data set S, and outputs the same as said check data; and
a restoring device comprising:
a storage device storing confidential information distribution-coded in accordance with access structure data indicative of an access structure of a linear secret sharing scheme, and distribution-coded data of check data generated to correspond with said confidential information;
a confidential information restoring device reading distribution-coded confidential information from said storage device corresponding to an access set of said access structure to restore said confidential information in accordance with said access structure data;
a check data restoring device reading distribution-coded check data from said storage device corresponding to the access set of said access structure to restore said check data in accordance with said access structure data; and
a falsity detection device outputting restored confidential information when check data restored by said check data restoring device correspond to confidential information restored by said confidential information restoring device, and outputting a signal indicative of falsity when the restored check data does not correspond to the restored confidential information,
wherein when arbitrary different elements of input set S input as said confidential information are $x\_1$ and $x\_2$: an arbitrary positive integer is a; an arbitrary function specifying data which is data for uniformly specifying elements of function set H is c; a set of said function specifying data is K; a falsity detection probability is $(1-\delta)$, H satisfies $|\{b|b\in K, H\_b(x\_1)=y, H\_{a*b+c}(x\_2)=y\}|/|\{b|b\in K, H\_b(x\_1)=y\}|\leq\delta$, wherein:
said falsity detection device determines that the check data restored by said check data restoring device correspond to the confidential information restored by said confidential information restoring device, when said function specifying data k which is the restored check data and restored confidential information x satisfy $H\_k(x)=y$; wherein:
when N is an integer, and p is a prime number; and
when said function specifying data $e\_0, e\_1$ which are restored check data and which are elements of Z/pZ, and when $(x\_1, x\_2, \ldots, x\_N)$ which are restored confidential information and which are elements of $(Z/pZ)^N$ satisfy $e\_0-(x\_1*e\_1+x\_2*e\_1^2+ \ldots +x\_N*e\_1^N+e\_1^{(N+1)}+e\_1^{(N+2)}+e\_1^{(N+4)})=0$, said falsity detection device determines that the check data restored by said check data restoring device corresponds to the confidential information restored by said confidential information restoring device.

23. A confidential information distribution system comprising:
a distributed information generator comprising:
a check data generator generating check data corresponding to confidential information;
a confidential information distributing device distribution-coding the confidential information in accordance with access structure data indicative of an access structure of a linear secret sharing scheme; and
a check data distributing device distribution-coding the check data in accordance with access structure data indicative of the same access structure as the access structure in accordance with which the confidential information is distribution-coded,
wherein said check data generator is:
a device which is applied with elements s of confidential information data set S; and
randomly selects and outputs function specifying data k uniquely specifying elements of function set H which satisfy $H\_k(x)=y$,
wherein said function set H satisfies $|\{b|b\in K, H\_b(x\_1)=y, H\_{a*b+c}(x\_2)=y\}|/|\{b|b\in K, H\_b(x\_1)=y\}|\leq\delta$ for arbitrary elements $x\_1$ and $x\_2$ of said confidential information data set S which differ from each other, and arbitrary function specifying data c of said function set H, where a is an arbitrary positive integer,
where K designates a set of said function specifying data, and $(1-\delta)$ designates a falsity detection probability;
wherein an access structure of a(k,n) threshold scheme is used as the access structure of the secret sharing scheme; and
a restoring device comprising:
a storage device storing confidential information distribution-coded in accordance with access structure data indicative of an access structure of a linear secret sharing scheme, and distribution-coded data of check data generated to correspond with said confidential information;
a confidential information restoring device for reading distribution-coded confidential information from said storage device corresponding to an access set of said access structure to restore said confidential information in accordance with said access structure data;
a check data restoring device reading distribution-coded check data from said storage device corresponding to the access set of said access structure to restore said check data in accordance with said access structure data; and
a falsity detection device outputting restored confidential information when check data restored by said check data restoring device correspond to confidential information restored by said confidential information restoring device, and outputting a signal indicative of falsity when the restored check data does not correspond to the restored confidential information,
wherein when arbitrary different elements of input set S input as said confidential information are $x\_1$ and $x\_2$: an arbitrary positive integer is a; an arbitrary function specifying data which is data for uniformly specifying elements of function set H is c; a set of said function specifying data is K; a falsity detection probability is $(1-\delta)$, H satisfies $|\{b|b\in K, H\_b(x\_1)=y, H\_{a*b+c}(x\_2)=y\}|/|\{b|b\in K, H\_b(x\_1)=y\}|\leq\delta$, wherein:
said falsity detection device determines that the check data restored by said check data restoring device correspond to the confidential information restored by said confidential information restoring device, when said function specifying data k which is the restored check data and restored confidential information x satisfy $H\_k(x)=y$;
wherein an access structure of a(k,n) threshold scheme is used as the access structure of said secret sharing scheme.

24. A non-transitory computer-readable recording medium storing a program which causes a computer to:
  generate check data corresponding to confidential information;
  distribution-code said confidential information in accordance with access structure data indicative of an access structure of a linear secret sharing scheme, and store the coded confidential information in a storage device; and
  distribution-code the check data in accordance with access structure data indicative of the same access structure as the access structure in accordance with which the confidential information is distribution-coded, and store the coded check data in the storage device,
  said program further causing the computer to
  receive elements s of confidential information data set S; and
  randomly select function specifying data k for uniquely specifying elements of function set H which satisfy $H\_k(x)=y$, and output the function specifying data k as said check data,
  wherein said function set H satisfies $|\{b|b \in K, H\_b(x\_1)=y, H\_\{a*b+c\}(x\_2)=y\}|/|\{b|b \in K, H\_b(x\_1)=y\}| \leq \delta$ for arbitrary elements x_1 and x_2 of said confidential information data set S which differ from each other, an arbitrary positive integer a, and arbitrary function specifying data c of said function set H,
  where K designates a set of said function specifying data, and $(1-\delta)$ designates a falsity detection probability.

25. The non-transitory computer-readable recording medium according to claim 24, wherein an access structure of a(k,n) threshold scheme is used as the access structure of the secret sharing scheme.

26. A non-transitory computer-readable recording medium storing a program which causes a computer to:
  read distribution-coded confidential information from a storage device for storing confidential information distribution-coded in accordance with access structure data indicative of an access structure of a linear secret sharing scheme, said distribution-coded confidential information corresponding to an access set of said access structure, and restore said confidential information in accordance with said access structure data;
  read distribution-coded check data from a storage device for storing distribution-coded data of check data generated to correspond with said confidential information, said distribution-coded check data corresponding to the access set of said access structure, and restore said check data in accordance with said access structure data; and
  output said restored confidential information when said restored check data corresponds to said restored confidential information, and output a signal indicative of falsity when said restored check data does not correspond to said restored confidential information,
  wherein when arbitrary different elements of input set S input as said confidential information are x_1 and x_2: an arbitrary positive integer is a; an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{a*b+c\}(x\_2)=y\}|/|\{b|b \in K, H\_b(x\_1)=y\}| \leq \delta$, wherein:
  said program causes the computer to determine that said restored check data correspond to said restored confidential information, when said function specifying data k which is the restored check data and restored confidential information x satisfy $H\_k(x)=y$.

27. The non-transitory computer-readable recording medium according to claim 26, wherein an access structure of a(k,n) threshold scheme is used as the access structure of said secret sharing scheme.

28. A non-transitory computer-readable recording medium storing a program, said program comprising:
  a program which causes a computer to:
  generate check data corresponding to confidential information;
  distribution-code said confidential information in accordance with access structure data indicative of an access structure of a linear secret sharing scheme, and store the coded confidential information in a storage device; and
  distribution-code the check data in accordance with access structure data indicative of the same access structure as the access structure in accordance with which the confidential information is distribution-coded, and store the coded check data in the storage device,
  said program further causing the computer to receive elements s of confidential information data set S; and
  randomly select function specifying data k for uniquely specifying elements of function set H which satisfy $H\_k(x)=y$, and output the function specifying data k as said check data,
  wherein said function set H satisfies $|\{b|b \in K, H\_b(x\_1)=y, H\_\{a*b+c\}(x\_2)=y\}|/|\{b|b \in K, H\_b(x\_1)=y\}| \leq \delta$ for arbitrary elements x_1 and x_2 of said confidential information data set S which differ from each other, an arbitrary positive integer a, and arbitrary function specifying data c of said function set H,
  where K designates a set of said function specifying data, and $(1-\delta)$ designates a falsity detection probability; and
  a program which causes a computer to:
  read distribution-coded confidential information from a storage device for storing confidential information distribution-coded in accordance with access structure data indicative of an access structure of a linear secret sharing scheme, said distribution-coded confidential information corresponding to an access set of said access structure, and restore said confidential information in accordance with said access structure data;
  read distribution-coded check data from a storage device for storing distribution-coded data of check data generated to correspond with said confidential information, said distribution-coded check data corresponding to the access set of said access structure, and restore said check data in accordance with said access structure data; and
  output said restored confidential information when said restored check data corresponds to said restored confidential information, and output a signal indicative of falsity when said restored check data does not correspond to said restored confidential information,
  wherein when arbitrary different elements of input set S input as said confidential information are x_1 and x_2: an arbitrary positive integer is a; an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{a*b+c\}(x\_2)=y\}|/|\{b|b \in K, H\_b(x\_1)=y\}| \leq \delta$, wherein:
  said program causes the computer to determine that said restored check data correspond to said restored confidential information, when said function specifying data k which is the restored check data and restored confidential information x satisfy $H\_k(x)=y$.

29. A non-transitory computer-readable recording medium storing a program, said program comprising:
a program which causes a computer to:
generate check data corresponding to confidential information;
distribution-code said confidential information in accordance with access structure data indicative of an access structure of a linear secret sharing scheme, and store the coded confidential information in a storage device; and
distribution-code the check data in accordance with access structure data indicative of the same access structure as the access structure in accordance with which the confidential information is distribution-coded, and store the coded check data in the storage device,
said program further causing the computer to:
receive elements s of confidential information data set S; and
randomly select function specifying data k for uniquely specifying elements of function set H which satisfy $H\_k(x)=y$, and to output the same as said check data, wherein:
said function set H satisfies $|\{b|b \in K, H\_b(x\_1)=y, H\_\{b+c\}(x\_2)=y\}|/|\{b|b \in K, H\_b(x\_1)=y\}| \leq \delta$ for arbitrary elements x_1 and x_2 of said confidential information data set S which differ from each other, and arbitrary function specifying data c of said function set H,
where K designates a set of said function specifying data, and $(1-\delta)$ designates a falsity detection probability;
wherein:
$(Z/pZ)^\wedge N$ is employed as confidential information data set S, where N is a positive value, and p is a prime number; and
said program further causes the computer to randomly select elements e_0 and e_1 of Z/pZ which satisfy $e\_0-(x\_1*e\_1+x\_2*e\_1^2+\ldots+x\_N*e\_1^\wedge N+e\_1^\wedge\{N+1\}+e\_1^\wedge\{N+2\}+e\_1^\wedge\{N+4\})=0$, for elements x_1 and x_2 of said confidential information data set S, and output the same as said check data: and
a program which causes a computer to:
read distribution-coded confidential information from a storage device for storing confidential information distribution-coded in accordance with an access structure data indicative of an access structure of a linear secret sharing scheme, said distribution-coded confidential information corresponding to an access set of said access structure, and restore said confidential information in accordance with said access structure data;
read distribution-coded check data from a storage device for storing distribution-coded data of check data generated to correspond with said confidential information, said distribution-coded check data corresponding to the access set of said access structure, and restore said check data in accordance with said access structure data; and
output said restored confidential information when said restored check data corresponds to said restored confidential information, and output a signal indicative of falsity when said restored check data does not corresponds to said restored confidential information,
wherein when arbitrary different elements of input set S input as said confidential information are x_1 and x_2:
an arbitrary function specifying data which is data for uniformly specifying elements of function set H is c; a set of said function specifying data is K; a falsity detection probability is $(1-\delta)$, H satisfies $|\{b|b \in K, H\_b(x\_1)=y, H\_\{b+c\}(x\_2)=y\}|/|\{b|b \in K, H\_b(x\_1)=y\}| \leq \delta$, wherein:
said program causes the computer to determine that said restored check data correspond to said restored confidential information, when said function specifying data k which is the restored check data and restored confidential information x satisfy $H\_k(x)=y$;
when N is a positive value, and p is a prime number; and
when said function specifying data e_0, e_1 which are restored data check data and which are elements of Z/pZ, and when (x_1, x_2, . . . , x_N) which are restored confidential information and which are elements of $(Z/pZ)^\wedge N$ satisfy $e\_0-(x\_1*e\_1+x\_2*e\_1^2+\ldots+x\_N*e\_1^\wedge N+e\_1^\wedge\{N+1\}+e\_1^\wedge\{N+2\}+e\_1^\wedge\{N+4\})=0$, said program causes the computer to determine that said restored check data correspond to said restored confidential information.

30. A non-transitory computer-readable recording medium storing a program, said program comprising:
a program which causes a computer to:
generate check data corresponding to confidential information;
distribution-code said confidential information in accordance with access structure data indicative of an access structure of a linear secret sharing scheme, and store the coded confidential information in a storage device; and
distribution-code the check data in accordance with access structure data indicative of the same access structure as the access structure in accordance with which the confidential information is distribution-coded, and store the coded check data in the storage device,
said program further causing the computer to
receive elements s of confidential information data set S; and
randomly select function specifying data k for uniquely specifying elements of function set H which satisfy $H\_k(x)=y$, and output the function specifying data k as said check data,
wherein said function set H satisfies $|\{b|b \in K, H\_b(x\_1)=y, H\_\{a*b+c\}(x\_2)=y\}|/|\{b|b \in K, H\_b(x\_1)=y\}| \leq \delta$ for arbitrary elements x_1 and x_2 of said confidential information data set S which differ from each other, an arbitrary positive integer a, and arbitrary function specifying data c of said function set H,
where K designates a set of said function specifying data, and $(1-\delta)$ designates a falsity detection probability;
wherein an access structure of a(k,n) threshold scheme is used as the access structure of the secret sharing scheme; and
a program which causes a computer to:
read distribution-coded confidential information from a storage device for storing confidential information distribution-coded in accordance with access structure data indicative of an access structure of a linear secret sharing scheme, said distribution-coded confidential information corresponding to an access set of said access structure, and restore said confidential information in accordance with said access structure data;
read distribution-coded check data from a storage device for storing distribution-coded data of check data generated to correspond with said confidential information, said distribution-coded check data corresponding to the access set of said access structure, and restore said check data in accordance with said access structure data; and
output said restored confidential information when said restored check data corresponds to said restored confidential information, and output a signal indicative of falsity when said restored check data does not correspond to said restored confidential information, wherein when arbitrary different elements of input set S input as said confidential information are x_1 and x_2: an arbitrary positive integer is a; an arbitrary function specifying data which is data for uniformly specifying elements of function set H is c; a set of said function specifying data is K; a falsity detection probability is (1−δ), H satisfies |{b|b∈K, H_b(x_1)=y, H_{a*b+c}(x_2)=y}|/|{b|b∈K, H_b(x_1)=y}|≦δ, wherein:

said program causes the computer to determine that said restored check data correspond to said restored confidential information, when said function specifying data k which is the restored check data and restored confidential information x satisfy H_k(x)=y;

wherein an access structure of a(k,n) threshold scheme is used as the access structure of said secret sharing scheme.

\* \* \* \* \*

UNITED STATES PATENT AND TRADEMARK OFFICE
CERTIFICATE OF CORRECTION

PATENT NO. : 8,214,647 B2
APPLICATION NO. : 12/307089
DATED : July 3, 2012
INVENTOR(S) : Toshinori Araki and Satoshi Obana It is certified that error appears in the above-identified patent and that said Letters Patent is hereby corrected as shown below:

In the Specification

Column 8, Line 41: delete "r" and insert -- $\perp$ --

Column 10, Line 47: delete "r" and insert -- $\perp$ --

Column 12, Line 57: delete "r" and insert -- $\perp$ --

Signed and Sealed this
Twenty-second Day of October, 2013

Teresa Stanek Rea
*Deputy Director of the United States Patent and Trademark Office*